Figure 10:
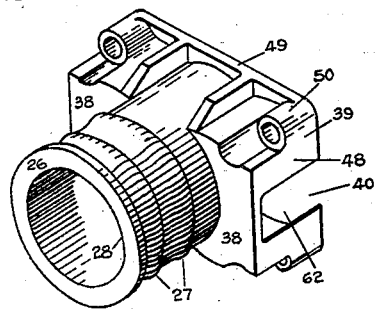

J. F. O'CONNOR.
FRICTION DRAFT RIGGING.
APPLICATION FILED OCT. 27, 1910.
991,797.
Patented May 9, 1911.
4 SHEETS—SHEET 1.
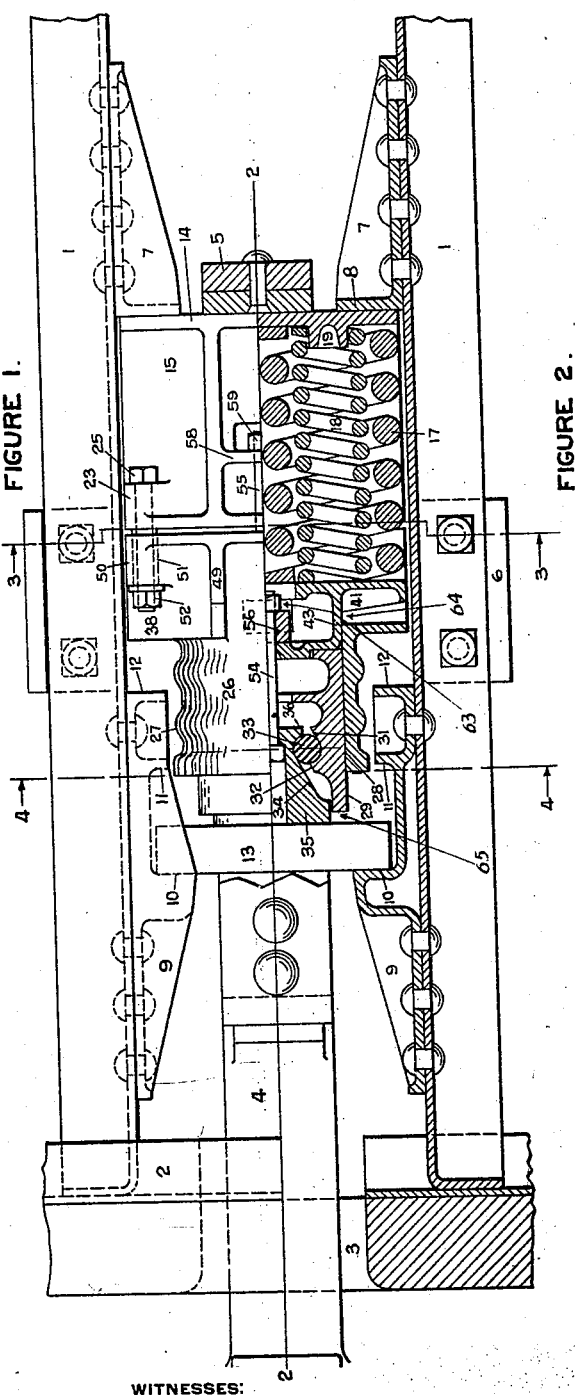
WITNESSES:
Calvin B. Patch
H. W. Munday
INVENTOR
John F. O'Connor.
by Munday, Evarts, Adcock & Clarke
his Attorneys J. F. O'CONNOR.
FRICTION DRAFT RIGGING.
APPLICATION FILED OCT. 27, 1910.
991,797.
Patented May 9, 1911.
4 SHEETS—SHEET 2.
FIGURE 3.
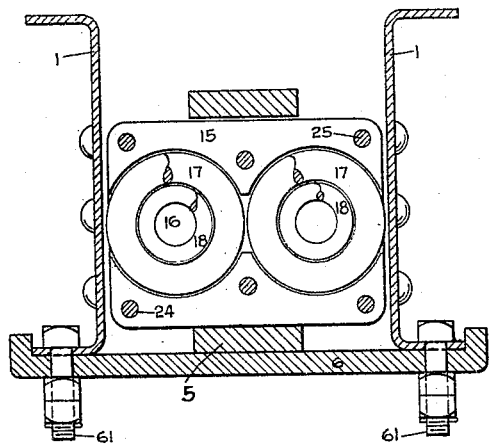
FIGURE 4.
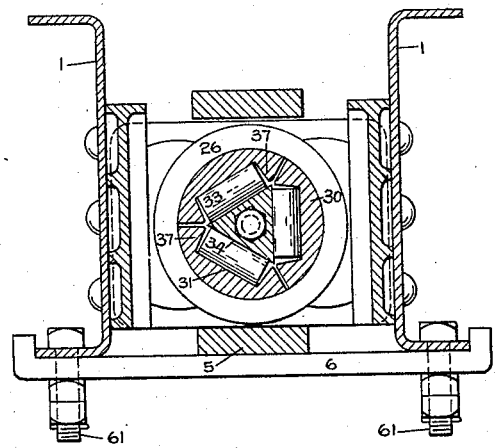
FIGURE 5.
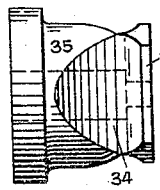
FIGURE 6.
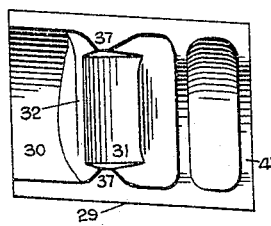
FIGURE 6ª.
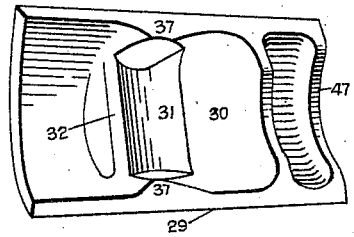
FIGURE 7.
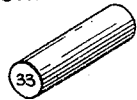
FIGURE 8.
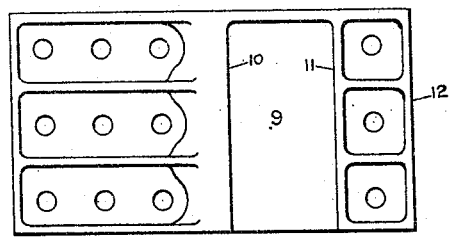
FIGURE 9.
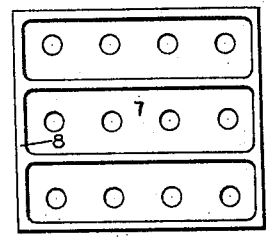
WITNESSES:
Calvin B. Patch
H. W. Munday
INVENTOR
John F. O'Connor.
by Munday, Evarts, Adcock
& Clarke
his Attorneys

J. F. O'CONNOR.
FRICTION DRAFT RIGGING.
APPLICATION FILED OCT. 27, 1910.

991,797.

Patented May 9, 1911.
4 SHEETS—SHEET 3.

WITNESSES:
Calvin B. Patch
H. W. Munday

INVENTOR
John F. O'Connor
by Munday, Evarts,
Adcock & Clarke
his Attorneys

J. F. O'CONNOR.
FRICTION DRAFT RIGGING.
APPLICATION FILED OCT. 27, 1910.
991,797.
Patented May 9, 1911.
4 SHEETS—SHEET 4.
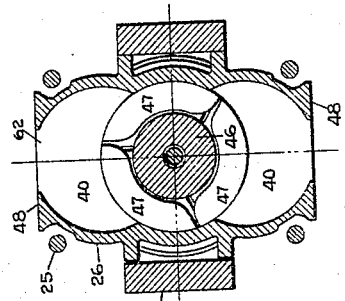
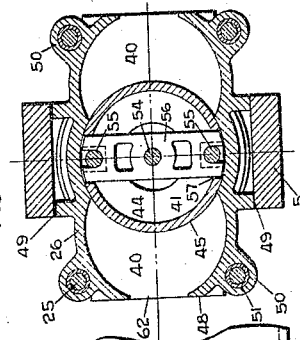
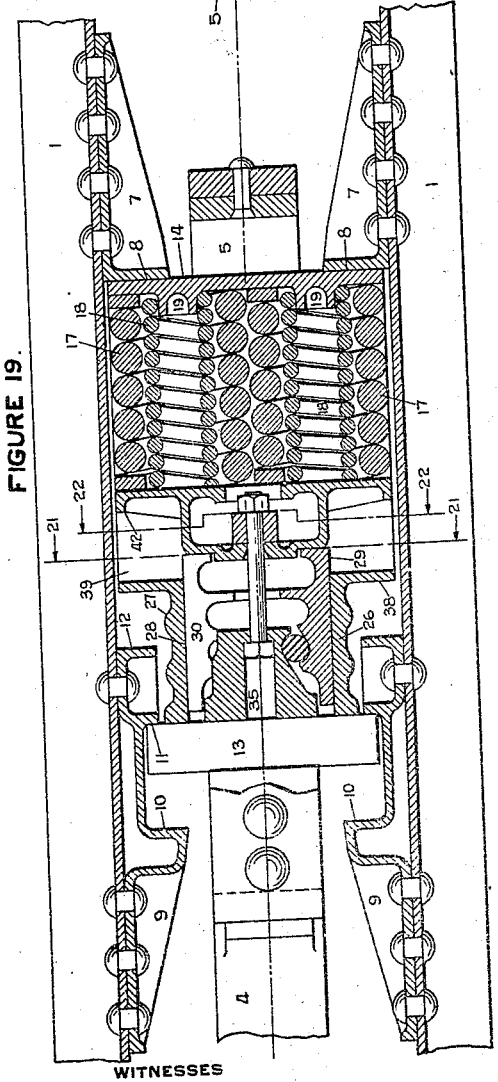
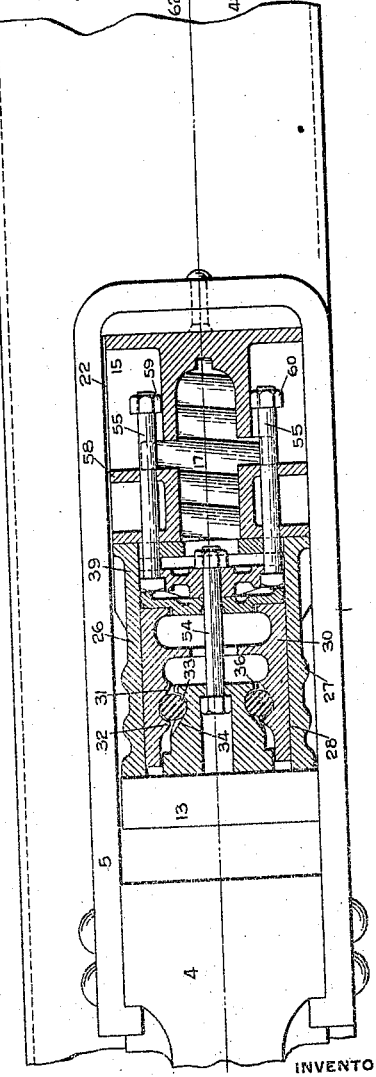
WITNESSES
Calvin B. Patch.
H. W. Munday
INVENTOR
John F. O'Connor.
by Munday, Evarts,
Adcock & Clarke
his attorneys

UNITED STATES PATENT OFFICE.

JOHN F. O'CONNOR, OF CHICAGO, ILLINOIS, ASSIGNOR TO W. H. MINER, OF CHICAGO, ILLINOIS.

FRICTION DRAFT-RIGGING.

991,797.   Specification of Letters Patent.   Patented May 9, 1911.

Application filed October 27, 1910. Serial No. 589,447.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.

The object of my invention is to provide a friction draft rigging of a strong, simple, efficient and durable construction, which will have high cushioning capacity, 300,000 to 500,000 pounds or more, which will be certain and reliable in its release action, which will be neither of undue length nor width, and thus capable of being mounted in the standard space between center sills of a car, and at the same time have adequate provision for limiting the compressive movement both in pulling and buffing and for distributing heavy shocks at different points to the center sills, in which the friction shell may be of a plain, simple and circular cross section, and thus adapted to successfully withstand the bursting strains to which it may be subjected from the wedge and friction shoes, and capable also of economical and perfect manufacture or casting, which will be adapted to properly cushion both light and heavy blows, in which the friction surfaces of the friction shoes and shell will not be subjected to such excessive pressure as to cause undue wear or abrasion, and in which all the parts of the cushioning mechanism may be connected and held in cooperative and assembled relation as a single unitary structure, to facilitate instalment and removal or replacement.

My invention consists in the novel construction of parts and devices and in the novel combinations of parts and devices herein shown and described, by which these important objects or results are practically accomplished in a single, unitary structure or friction draft rigging, without sacrifice of or interfering with the others.

Figure 11:
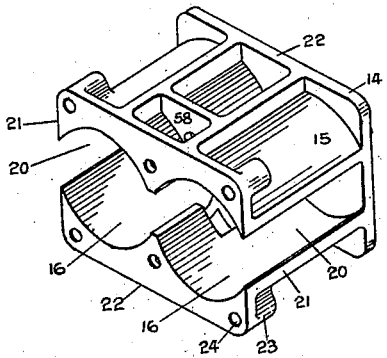
Figures 12, 13:
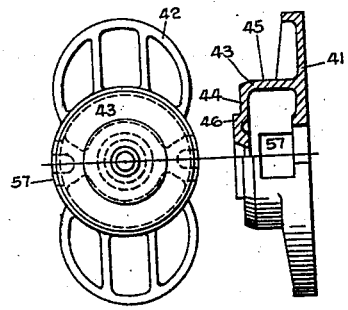
Figures 14, 15:
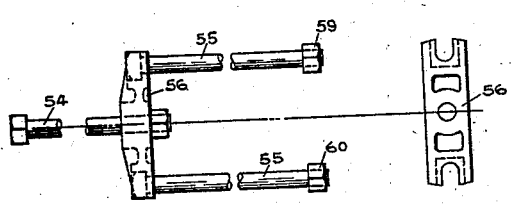
Figures 16, 17:
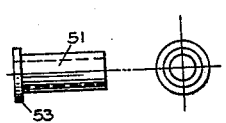
Figure 18:
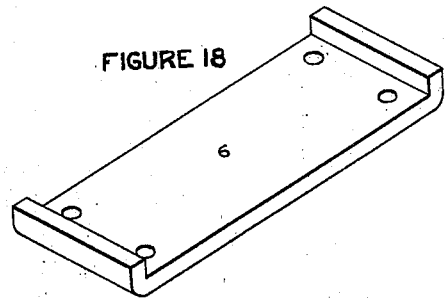

In the accompanying drawing forming a part of this specification, Figure 1 is a plan view, partly in horizontal section, on line 1—1 of Fig. 2. Fig. 2 is an elevation, partly in central, vertical section on line 2—2 of Fig. 1. Figs. 3 and 4 are cross sections on lines 3—3 and 4—4 respectively of Fig. 1. Fig. 5 is a detail plan view of the wedge. Fig. 6 is a detail plan view and Fig. 6a is a perspective view of one of the friction shoes. Fig. 7 is a detail perspective view of one of the anti-friction rollers. Figs. 8 and 9 are elevations of the front and rear stop members. Fig. 10 is a detail perspective view of the friction shell. Fig. 11 is a detail perspective view of the spring cage. Fig. 12 is a detail elevation of the twin spring seat or bearing member. Fig. 13 is a plan view of same, partly in section. Fig. 14 is a detail elevation of the bridge block or member and connecting bolts. Fig. 15 is a detail elevation of the bridge block or member. Fig. 16 is a detail elevation of the preliminary compression regulating thimble which is interposed between the friction shell and spring cage. Fig. 17 is an end view of same. Fig. 18 is a detail perspective view of the tie-plate. Fig. 19 is a horizontal section (with one friction shoe in plan), showing the cushioning mechanism compressed under buffing stress; Fig. 20 is a vertical section, showing the mechanism compressed under pulling stress. Figs. 21 and 22 are detail cross sections on lines 21—21 and 22—22 of Fig. 19.

In the drawing, 1 represents the draft sills or members of the car frame to which the draft rigging is applied, the same preferably being rolled steel center sills, 2 the end sill, 3 the carry-iron, 4 the draw-bar, 5 the draft yoke. 6 the tie-plate, 7 rear stop members secured to the center sills and having rear stop shoulders 8, 9 front stop members having front stop shoulders 10 and limiting stop shoulders 11, 12, and 13 is the front follower, all these parts being preferably of standard car construction.

The rear follower 14 which abuts against the stop shoulders 8 of the rear stop members 7, is preferably made integral with the twin spring cage 15, which is preferably of generally rectangular shape, and provided with a pair of sockets or seats 16 to receive the twin or side by side arranged springs 17, each of which preferably incloses a smaller spring 18 nested within it, the spring cage having a pair of bosses 19 to fit within the rear ends of the smaller springs 18.

To give room for the two large springs 17 side by side between the center sills 1, 1, the spring cage 15 is provided with longitudinal slots or openings 20 in its upright faces 21, which fit against the upright webs of the center sills, the upright faces of the rectangular spring cage thus serving as guides for it in its reciprocating movements. The upper and lower horizontal faces 22 of the spring cage fit and engage the inner faces of the draft yoke, the lower limb of which rests upon the removable tie-plate 6, which thus supports the entire cushioning mechanism of the draft rigging.

The spring cage 15 is provided at its front corners with lugs 23, having holes 24 to receive the short connecting bolts 25 by which the spring cage is connected to the friction shell 26, and permitted to move longitudinally in respect thereto the limited extent, preferably about one quarter inch, necessary to provide for the desired preliminary compression of the twin springs 17, 17 before the friction cushioning mechanism comes into action.

The friction shell 26 is of cylindrical form or circular in cross section, and preferably furnished with external annular ribs 27 to further increase its strength against bursting strain. It has a longitudinally extending friction face 28, which is in sliding frictional contact with the exterior friction faces 29 of the segmental friction shoes 30 which are preferably three in number. Each of the friction shoes 30 has an inclined or wedging inner face 31 furnished with a stop shoulder 32 for the anti-friction roller 33, one of which is interposed between each of the friction shoes and the corresponding wedge face 34 of the wedge 35 which is interposed between the front follower 13 and the friction shoes 30. The wedge preferably is of pyramidal form and provided with three wedge faces, one for each of the friction shoes, and each inclined face of the wedge has a shoulder 36 to keep the anti-friction roller 33 in its proper transverse arrangement. Each of the friction shoes is also provided with shoulders 37, 37 for engagement with the ends of the anti-friction roller 33, and thus keep the roller in place lengthwise.

The friction shell 26 is furnished at its rear end with externally projecting integral stop wings or shoulders 38 for engagement with the rear limiting stop shoulders 12 of the front stop members 9 to limit the forward movement of the friction shell under pulling strains and to distribute the shock to the center sills at different portions of their length. The friction shell 26 is also preferably provided at its rear end with an integral hollow box shaped extension or guide member 39, having sockets 40 to receive the front ends of the twin springs 17, 17, and the twin spring seat member 41; the ends 42 of which are rounded to conform to the springs, and which has on its front face a raised central bearing or hub portion 43, having an annular shoulder or face 44 to bear against the rear ends of the friction shoes, the peripheral wall 45 fitting within the rear, cylindrical inner peripheral wall of the friction shell. It also has a circular boss or shoulder 46 which fits within the annular, segmental inturned flanges 47 of the friction shoes.

The extension or guide member 39 at the rear end of the friction shell is of generally rectangular shape, conforming in size and shape to the spring cage 15 and its upright faces 48 fit between and engage the upright faces of the center sills between which the draft rigging is mounted. And the top and bottom horizontal faces 49 of this extension or guide member 39 fit against the inner faces of the draft yoke 5. The extension or guide member 39 of the friction shell is furnished at the four corners thereof with lugs 50 to receive the connecting bolts 25 and the thimbles which surround said connecting bolts and serve to limit the extent to which the nuts 52 of the connecting bolts may be screwed up, and thus regulate the extent of relative movement permitted between the spring cage and friction shell and the consequent amount of preliminary compression of the twin springs that may take place before the friction cushioning mechanism comes into action. The thimbles 51 have heads or flanges 53 for engagement with the nuts of the connecting bolts 25.

54, 55, 55 are connecting bolts extending between the wedge 35 and the spring cage 15, the bolt 54 extending centrally from the inner end of the wedge and connecting with the bolts 55, 55 by a bridge block or member 56, which fits in a recess 57 formed to receive it in the twin spring seat member 41; the separated bolts 55, 55 are thus centrally above and below the tangentially meeting portions of the peripheries of the twin springs 17, 17. The spring cage 15 is provided with transverse webs 58 through which the bolts 55 pass and against which their nuts 59, 60 bear. The threaded nuts of the connecting bolts 54, 55 enable adjustment to be readily made in respect to the extent that the wedge 35 projects beyond the front end of the friction shell. The connecting bolts 54, 55 also serve to hold all the parts of the spring and friction cushioning mechanism assembled in coöperative relation and connected together as a single unit, so that the same may be quickly and conveniently installed and readily removed and replaced by simply taking out the bolts 61 which connect the removable tie-plates 6 with the center sills 1 of the car.

The extension or guide member 39 at the rear end of the friction shell is furnished with slots or openings 62 in its upright sides similar to the slots or openings 20 in the spring cage to accommodate and give room for the twin or side by side arranged springs between the center sills.

As in my invention, the wedge is interposed between the draw-bar and the friction shoes, and as anti-friction rollers are interposed between the wedge and the friction shoes, and as the twin springs react at one end, through the spring cage and connecting bolts, against the friction shell and at their other end against the friction shoes, through the interposed twin spring seat and its integral central bearing member, so that the twin springs when compressed directly act to longitudinally separate the friction shoes and shell in respect to each other and thus cause the friction mechanism to release when the pressure of the draw-bar is relieved against the wedge, and as the force of the powerful twin springs when compressed is all utilized to produce such release action and does not act to spread or wedge the shoes radially outward against the shell, and thus interfere with proper release action, I am enabled to secure, with my improved friction draft rigging, an exceedingly high cushioning capacity, and at the same time a perfect, certain and reliable release action.

As in my invention the upright sides of the rectangular spring cage and of the rectangular guide and stop shoulder member at the rear end of the friction shell are longitudinally slotted or cut away at the middle of their upright faces, powerful twin springs of relatively large size spring rod and large diameter are adapted to be arranged side by side between the center sills of the car, and as the friction shell is provided at its rear end with stop wings or shoulders for engagement with the rear limiting stop shoulder of the front draft members so that the stop members are not thus required to extend along the center sills adjacent to the springs, I am thus enabled to utilize the full space between the center sills for reception of the twin or side by side arranged springs and for the spring cage and front twin spring seat or follower.

The friction shoes 35 each preferably have their parallel side edges oblique or extending at an angle to the axis of the friction shell, so that in operation the entire interior friction face of the friction shell will be uniformly engaged and acted upon by the friction shoes, and to avoid all possibility of ridges being formed on the friction shell at the longitudinal meeting edges of the friction shoes.

When the gear is assembled, the twin springs 17, 17 are preferably put under an initial compression of about one half inch by the connecting bolts 25, which connect the friction shell 26 with the spring cage 15. And then the twin springs are preferably put under a further initial compression of about one half inch by the connecting bolts 54, 55, 55, which connect the twin spring seat 41 with the wedge 35, this further initial compression of the twin springs enabling the springs themselves to automatically take up any wear of the friction mechanism, and to keep the overall length of the cushioning mechanism as a whole always constantly the same, and also holding all the engaging parts in snug contact with each other, and preventing all play or lost motion. To provide for this automatic taking up of wear by the twin springs and consequent necessary movement of the friction shoes relative to the friction shell and wedge as wear takes place, a clearance of one half inch or such matter is left at 63 between the bridge block 56 and the adjacent wall of the twin spring seat 41, and also a like clearance 64 between the adjacent end walls of the twin spring seat 41 and the friction shell 26, and also a like clearance 65 between the front ends of the friction shoes 29 and the front follower 13.

I claim:—

1. In a friction draft rigging, the combination with a draw-bar, draft yoke and stop members, of a cylindric, longitudinally movable friction shell centrally in line with the draw-bar, and provided at its rear end with an integral hollow rectangular enlargement to receive a twin spring seat plate and the front ends of twin springs, friction shoes and wedge within said friction shell, anti-friction rollers between said wedges and shoes, a twin spring cage separate from and connected to said friction shell, twin springs reacting at one end through said twin spring cage against the friction shell and at their other end longitudinally against the friction shoes, the force of said twin springs when compressed acting to longitudinally move the friction shoes in respect to the friction shell in the release movement, and said anti-friction rollers coöperating to facilitate the action of said twin springs in effecting such release, substantially as specified.

2. In a friction draft rigging, the combination with a draw-bar and draft yoke, of a longitudinally movable friction shell, friction shoes within the shell, a wedge interposed between said draw-bar and shoes, a twin spring seat having a central bearing acting against the opposite ends of said shoes from said wedge, a spring cage separate from said shell, twin springs between said spring cage and said twin spring seat, and connections between said spring cage and friction shell, said twin spring seat acting to transmit the thrust of said twin springs to said friction shoes without radial spreading action on the shoes and consequent interference with the release action, substantially as specified.

3. In a friction draft rigging, the combination with a draw-bar, draft yoke, center sills, stop members and front follower, of a longitudinally movable friction shell having at its rear end an integral guide extension fitting and extending between said center sills and embraced between the upper and lower limbs of the draft yoke, friction shoes within the shell, a wedge interposed between said draw-bar and shoes, a twin spring seat fitting within said guide extension of said shell and having a central bearing acting against the opposite end of said shoes from said wedge, a twin spring cage fitting and extending between said center sills and embraced by said yoke, twin springs between said spring cage and twin spring seat, and connecting bolts extending between said spring cage and said guide extension of said friction shell, substantially as specified.

4. In a friction draft rigging, the combination with a draw-bar, draft yoke, center sills, stop members and front follower, of a longitudinally movable friction shell having at its rear end an integral guide extension fitting and extending between said center sills and embraced between the upper and lower limbs of the draft yoke, friction shoes within the shell, a wedge interposed between said draw-bar and shoes, a twin spring seat fitting within said guide extension of said shell and having a central bearing acting against the opposite end of said shoes from said wedge, a twin spring cage fitting and extending between said center sills and embraced by said yoke, twin springs between said spring cage and twin spring seat, and connecting bolts extending between said spring cage and said guide extension of said friction shell, and connecting bolts extending between said wedge and said twin spring cage, substantially as specified.

5. In a friction draft rigging, the combination with a draw-bar, draft yoke, center sills, stop members and front follower, of a longitudinally movable friction shell having at its rear end an integral guide extension fitting and extending between said center sills and embraced between the upper and lower limbs of the draft yoke, friction shoes within the shell, a wedge interposed between said draw-bar and shoes, a twin spring seat fitting within said guide extension of said shell and having a central bearing acting against the opposite end of said shoes from said wedge, a twin spring cage fitting and extending between said center sills and embraced by said yoke, twin springs between said spring cage and twin spring seat, and connecting bolts extending between said spring cage and said guide extension of said friction shell, said connecting bolts permitting a limited longitudinal movement of said spring cage in respect to said friction shell, and stop thimbles surrounding said connecting bolts, substantially as specified.

6. In a friction draft rigging, the combination with a draw-bar, draft yoke, center sills, stop members and front follower, of a longitudinally movable friction shell having at its rear end an integral guide extension fitting and extending between said center sills and embraced between the upper and lower limbs of the draft yoke, friction shoes within the shell, a wedge interposed between said draw-bar and shoes, a twin spring seat fitting within said guide extension of said shell and having a central bearing acting against the opposite end of said shoes from said wedge, a twin spring cage fitting and extending between said center sills and embraced by said yoke, twin springs between said spring cage and twin spring seat, connecting bolts extending between said spring cage and said guide extension of said friction shell, a bridge block between said wedge and said spring cage, a connecting bolt extending from said wedge to said bridge block, and a pair of connecting bolts extending from said bridge block to said spring cage, substantially as specified.

7. In a friction draft rigging, the combination with a longitudinally movable friction shell, of a wedge and friction shoes within the shell, twin springs arranged parallel and adjacent to each other, a twin spring seat interposed between said springs and said friction shoes and having separate bearings for the springs and a bearing surface on the opposite face thereof to act longitudinally on said shoes, said springs re-acting at one end through said twin spring seat against said friction shoes without exerting radial spreading action thereon in the release movement, substantially as specified.

8. In a friction draft rigging the combination with a longitudinally movable friction shell, having a cylindrical portion at one end to receive friction shoes and an outwardly projecting enlarged extension at its other end to receive a twin seat plate and one end of twin springs, of a wedge and friction shoes within the cylindric portion of said friction shell, a twin spring cage separate from said shell and connections between said cage and friction shell, twin springs arranged side by side and fitting at one end within said enlarged extension of said friction shell, a twin spring seat plate interposed between said twin springs and said friction shoes, said twin springs reacting at one end through said twin spring seat against said friction shoes and said springs re-acting at their other end against said friction shell through said twin spring cage and its connections with said friction shell.

9. In a friction draft rigging, the combination with a longitudinally movable friction shell having an oblong enlargement at one end to receive a twin spring seat, of a wedge and friction shoes within the shell, twin springs, a twin spring seat having separate bearings for the springs and a bearing surface on its opposite side to act longitudinally against the shoes, and a twin spring follower acting member connected to said friction shell and against which said twin springs react at one end, said twin springs reacting at their other end against said twin spring seat and through said seat against said shoes, substantially as specified.

JOHN F. O'CONNOR.

Witnesses:
 PEARL ABRAMS,
 EDMUND ADCOCK.

Copies of this patent may be obtained for five cents each, by addressing the "Commissioner of Patents, Washington, D. C."